United States Patent
Ohshima

(10) Patent No.: US 10,616,816 B2
(45) Date of Patent: Apr. 7, 2020

(54) COMMUNICATION APPARATUS, METHOD FOR CONTROLLING SAME, AND STORAGE MEDIUM

(71) Applicant: CANON KABUSHIKI KAISHA, Tokyo (JP)

(72) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/892,191

(22) Filed: Feb. 8, 2018

(65) Prior Publication Data
US 2018/0242215 A1 Aug. 23, 2018

(30) Foreign Application Priority Data

Feb. 22, 2017 (JP) .................................. 2017-031500

(51) Int. Cl.
| | |
|---|---|
| *H04W 36/24* | (2009.01) |
| *H04L 29/14* | (2006.01) |
| *H04W 4/80* | (2018.01) |
| *H04W 84/12* | (2009.01) |
| *H04W 76/10* | (2018.01) |
| *H04W 84/18* | (2009.01) |
| *H04W 36/14* | (2009.01) |
| *H04W 88/06* | (2009.01) |

(52) U.S. Cl.
CPC .............. *H04W 36/24* (2013.01); *H04L 69/40* (2013.01); *H04W 4/80* (2018.02); *H04W 36/14* (2013.01); *H04W 76/10* (2018.02); *H04W 84/12* (2013.01); *H04W 84/18* (2013.01); *H04W 88/06* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/166* (2018.01)

(58) Field of Classification Search
CPC ... H04W 76/045; H04W 36/22; H04W 24/10; H04W 88/06; H04W 76/19; H04W 76/25; H04W 76/34; H04W 76/15; H04W 76/16; H04W 4/00; H04B 1/406; H04B 7/00; H04J 3/00
See application file for complete search history.

(56) References Cited

U.S. PATENT DOCUMENTS

2004/0071123 A1* 4/2004 Shin .................... H04L 61/2015
370/338
2007/0281617 A1* 12/2007 Meylan ................. H04W 16/14
455/41.2

(Continued)

FOREIGN PATENT DOCUMENTS

JP 2013-150177 A 8/2013

*Primary Examiner* — Jung Liu
(74) *Attorney, Agent, or Firm* — Canon USA, Inc. IP Division

(57) ABSTRACT

When communication via a first communication interface is established, a mode of the established communication via the first communication interface is stored. If an error of the established communication via the first communication interface is detected, a determination is made whether to establish communication via a second communication interface or re-establish the communication via the first communication interface based on the stored mode of the established communication.

15 Claims, 12 Drawing Sheets

(56) References Cited

U.S. PATENT DOCUMENTS

| | | | |
|---|---|---|---|
| 2010/0316027 A1* | 12/2010 | Rick | H04B 1/406 |
| | | | 370/336 |
| 2012/0331140 A1* | 12/2012 | Wang | H04W 40/246 |
| | | | 709/224 |
| 2013/0089027 A1* | 4/2013 | Son | H04W 80/02 |
| | | | 370/328 |
| 2013/0177043 A1* | 7/2013 | Wyper | H04W 88/06 |
| | | | 375/132 |
| 2014/0169249 A1* | 6/2014 | Wentink | H04W 74/085 |
| | | | 370/311 |
| 2015/0049707 A1* | 2/2015 | Vajapeyam, Sr. | H04W 24/10 |
| | | | 370/329 |
| 2016/0262056 A1* | 9/2016 | Chen | H04W 28/20 |
| 2017/0094512 A1* | 3/2017 | Kiss | H04L 63/0853 |

\* cited by examiner

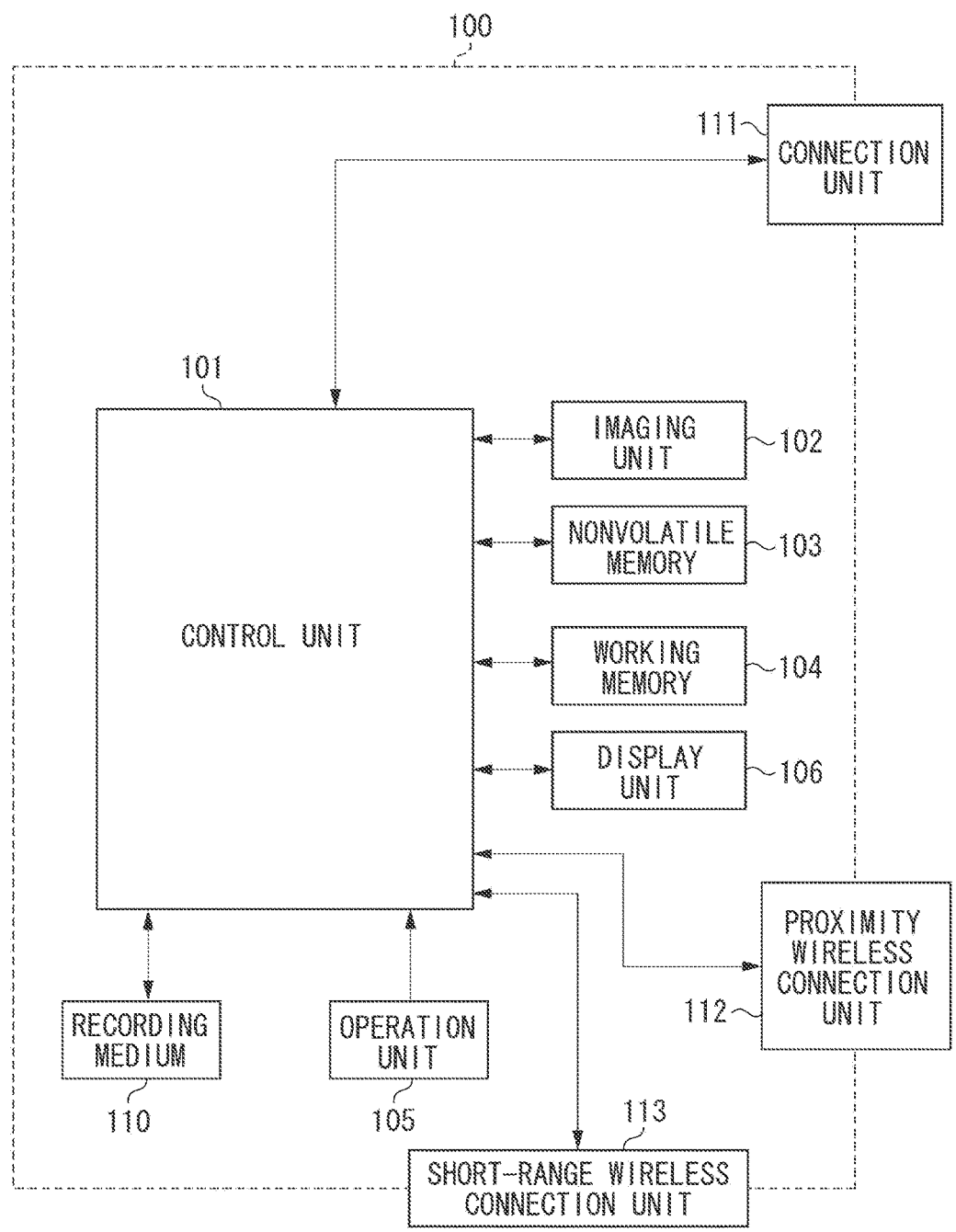

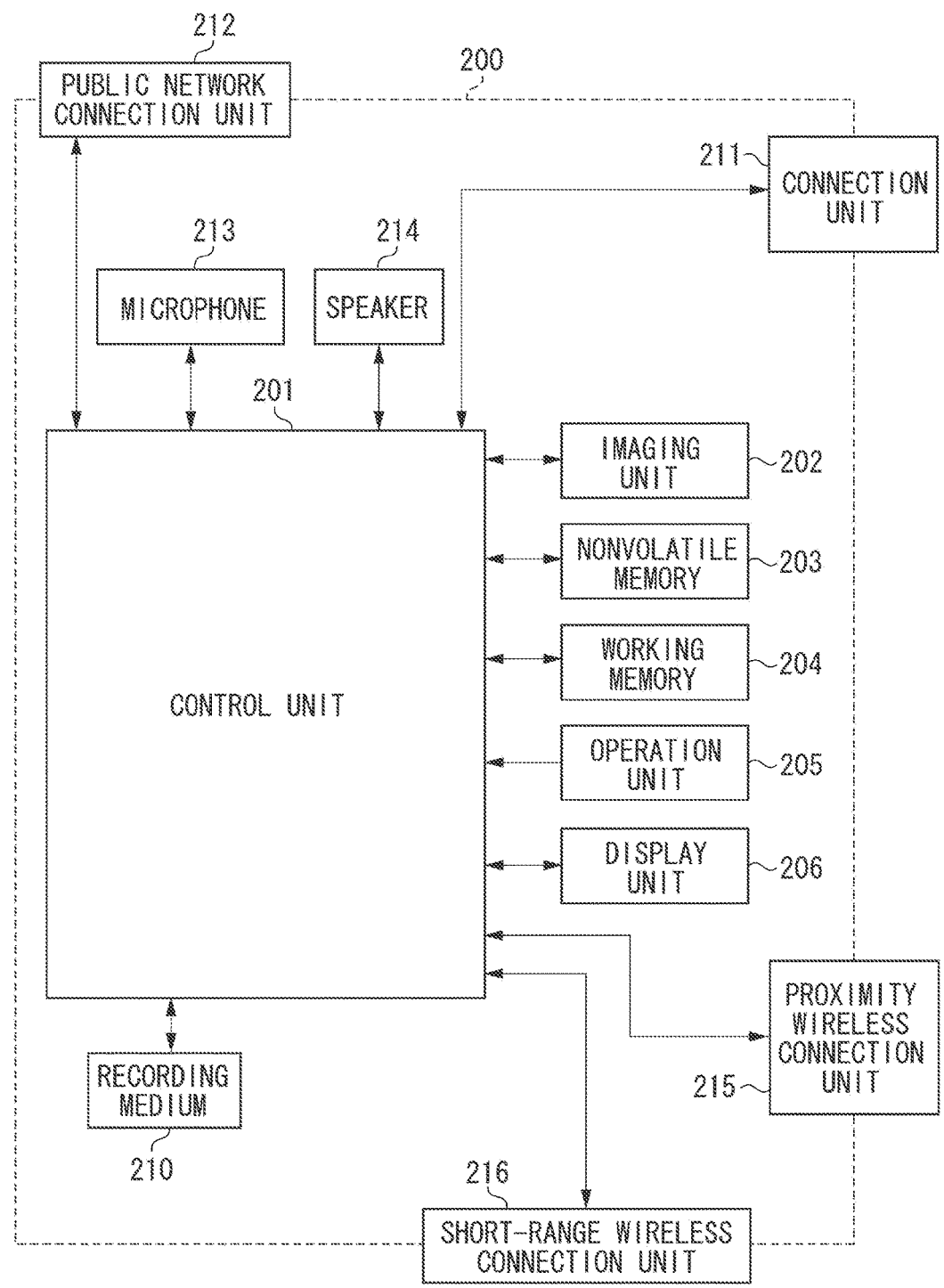

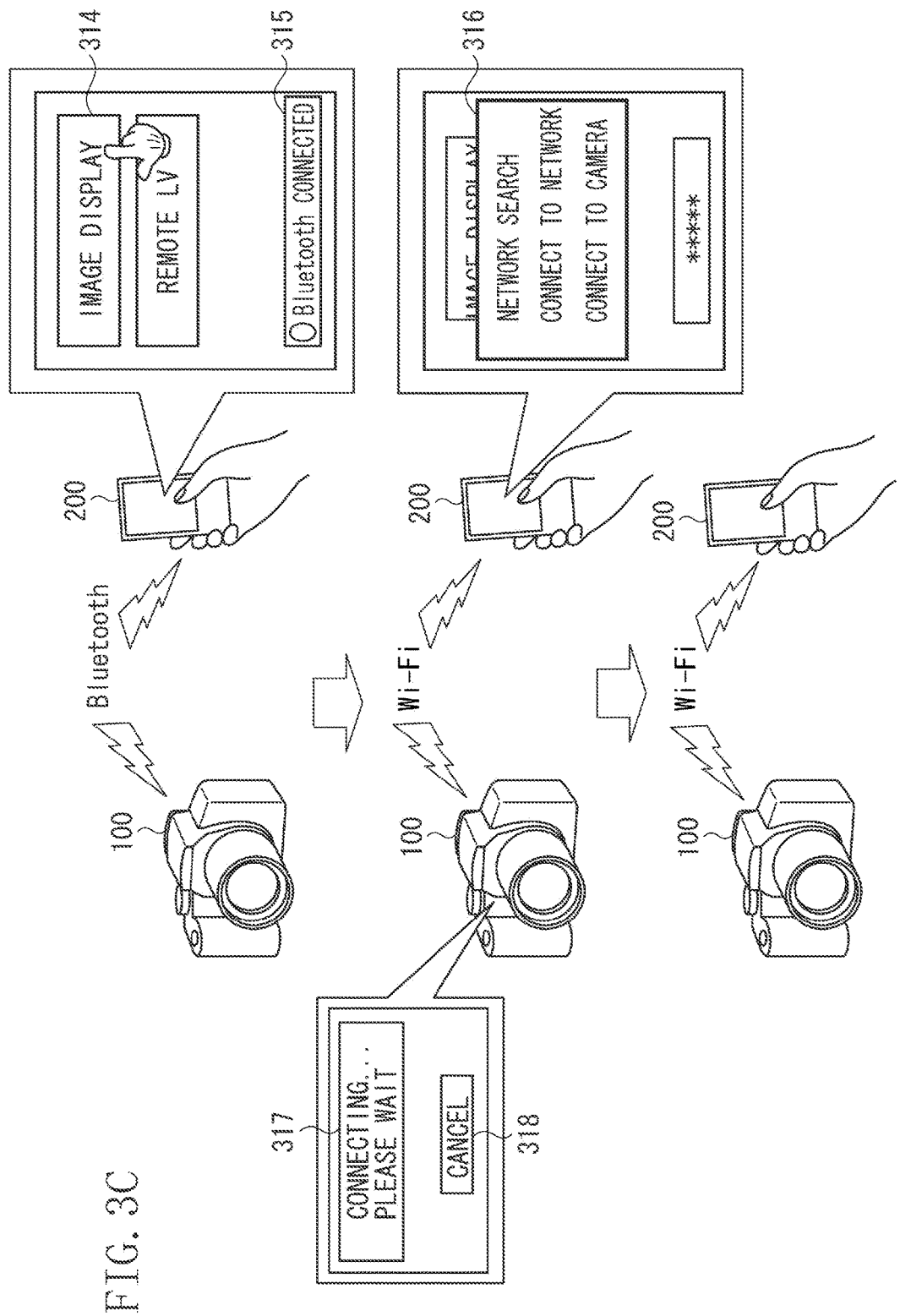

COMMUNICATION APPARATUS, METHOD FOR CONTROLLING SAME, AND STORAGE MEDIUM

BACKGROUND

Field

The present disclosure relates to connection processing with an external device.

Description of the Related Art

Imaging apparatuses such as a digital camera equipped with a wireless communication apparatus have recently become connectable to an external device apparatus such as a smartphone. This has enabled storing image data obtained by imaging by an imaging apparatus in an external device apparatus by selecting the image data on the external device apparatus side and transmitting the image data from the imaging apparatus to the external device apparatus. In other applications, a live view image captured by the imaging apparatus can be displayed on the external device apparatus in real time.

There has been known a technique for reconnecting communication apparatuses, like the foregoing imaging apparatus and smartphone, without operating the communication apparatuses if communication between the communication apparatuses is disconnected due to some reason. For example, Japanese Patent Application Laid-Open No. 2013-150177 discusses a technique in which, if a communication error occurs during a wireless local area network (LAN) connection, whether the wireless LAN needs to be re-set is determined to switch a method of reconnection. Such a technique is particularly useful, for example, if a communication apparatus is installed in a location difficult for the user to operate.

SUMMARY

According to an aspect of the present disclosure, a communication apparatus that communicates with an external apparatus includes at least one processor, a memory, a first communication interface, and a second communication interface, wherein the processor is configured to function as a storage unit configured to, when communication via the first communication interface is established, store a mode of the established communication via the first communication interface, a determination unit configured to, if an error of the established communication via the first communication interface is detected, determine whether to establish communication via the second communication interface or re-establish the communication via the first communication interface based on the stored mode of the established communication, and a control unit configured to start processing for establishing the communication via the first communication interface by using the communication via the second communication interface.

Further features will become apparent from the following description of exemplary embodiments with reference to the attached drawings.

BRIEF DESCRIPTION OF THE DRAWINGS

FIG. 1 is a block diagram illustrating a configuration of a digital camera according to an exemplary embodiment.

FIG. 2 is a block diagram illustrating a configuration of an external device apparatus according to the exemplary embodiment.

FIG. 3C is a diagram illustrating a handover from Bluetooth® communication to the wireless LAN communication according to the exemplary embodiment.

DESCRIPTION OF THE EMBODIMENTS

Figure 3A:
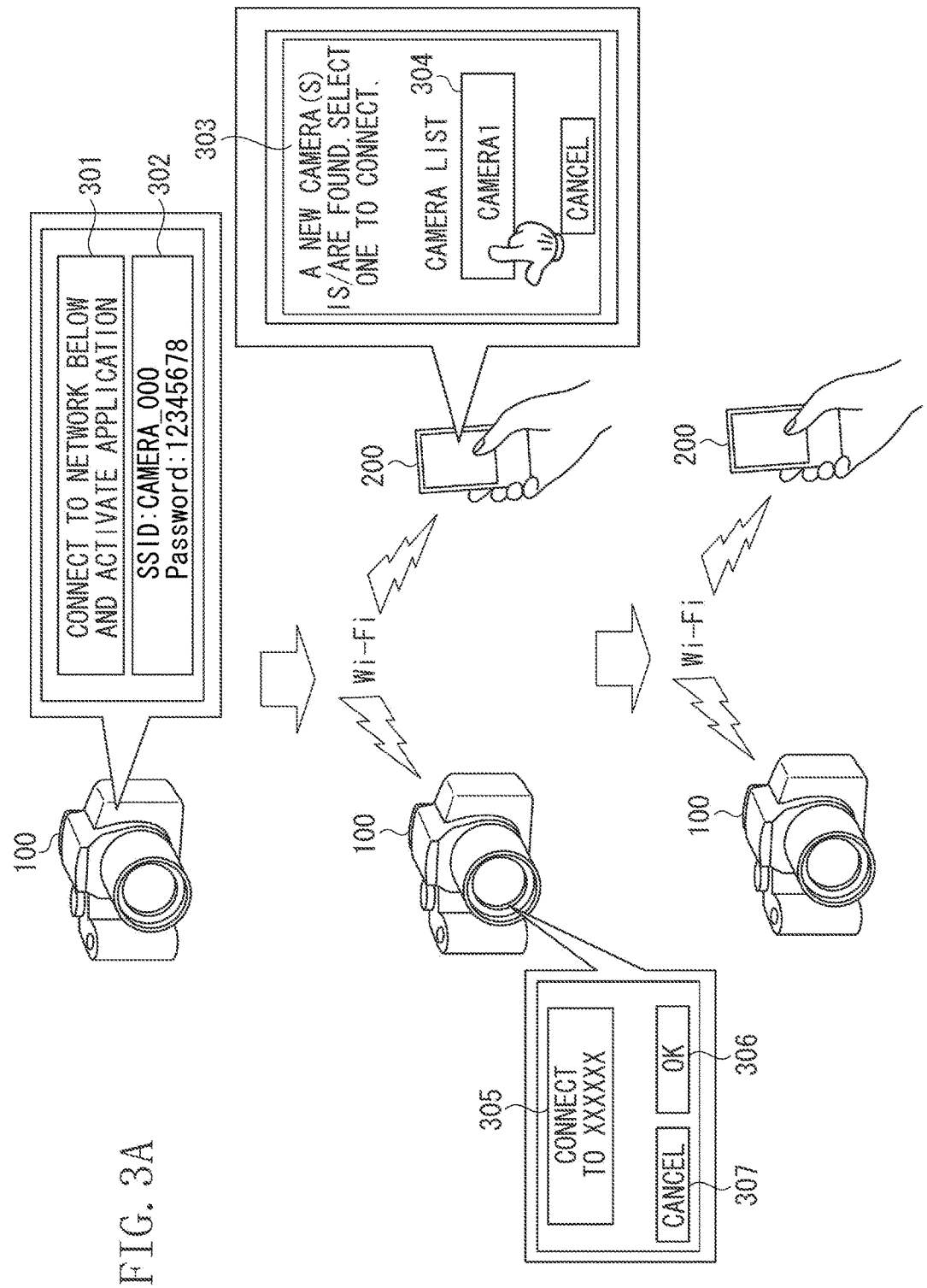
FIG. 3A is a diagram illustrating a manual connection by digital camera operations according to the exemplary embodiment.

Exemplary embodiments will be described in detail below with reference to the accompanying drawings. The following exemplary embodiments are examples for carrying out the present disclosure, and changes and modifications can be made as appropriate based on configurations and various conditions of apparatuses to which the exemplary embodiments are applied. The exemplary embodiments can be combined as appropriate.

An exemplary embodiment in a case where a communication apparatus according to the present exemplary embodiment is an imaging apparatus such as a digital camera will be described. However, this is not restrictive. For example, the present exemplary embodiment can be applied to information processing apparatuses such as a mobile phone, a portable media player, a tablet device, and a personal computer.

An overview of a configuration and functions of a digital camera according to a first exemplary embodiment will be described with reference to FIG. 1.

In FIG. 1, a control unit 101 controls various parts of a digital camera 100 according to input signals as well as programs to be described below. Instead of controlling the entire apparatus by the control unit 101, a plurality of pieces of hardware may control the entire apparatus by performing processing in a distributed manner.

An imaging unit 102 includes a lens. The imaging unit 102 converts object light focused by the lens into an electrical signal, performs noise reduction, and outputs digital data as image data. The captured image data is stored in a buffer memory, and then the control unit 101 performs a predetermined calculation and records the resulting image data on a recording medium 110.

A nonvolatile memory 103 is an electrically erasable and recordable nonvolatile memory. The nonvolatile memory 103 stores the programs to be described below, which the control unit 101 executes.

A working memory 104 is used as a buffer memory for temporarily storing the image data obtained by imaging by the imaging unit 102, an image display memory of a display unit 106, and a working area of the control unit 101.

An operation unit 105 is used to accept instructions to the digital camera 100 from the user. For example, the operation unit 105 includes operation members such as a power button for the user to instruct the digital camera 100 to power on/off, a release switch for giving instructions on imaging, and a playback button for giving a playback instruction for image data. A touch panel formed on the display unit 106 to be described below is also included in the operation unit 105. The release switch includes switches SW1 and SW2. If the release switch is half-pressed, the switch SW1 turns on. An instruction to make imaging preparations, such as automatic focus (AF) processing, automatic exposure (AE) processing, automatic white balance (AWB) processing, and electronic flash (EF) (flash preliminary emission) processing, is thereby accepted. If the release switch is fully pressed, the switch SW2 turns on. An instruction to perform imaging is thereby accepted.

The display unit 106 displays a viewfinder image during imaging, displays captured image data, and displays characters for interactive operation screens. The display unit 106 does not necessarily need to be built in the digital camera 100. The digital camera 100 may be connectable to an internal or external display unit 106 and at least have a display control function of controlling display of the display unit 106.

The recording medium 110 can record the image data output from the imaging unit 102. The recording medium 110 may be configured to be removably attachable to the digital camera 100. The recording medium 110 may be built in the digital camera 100. In other words, the digital camera 100 may at least include a unit for accessing the recording medium 110.

A connection unit 111 is an interface for connection with an external apparatus. The digital camera 100 according to the present exemplary embodiment can exchange data with an external apparatus via the connection unit 111. In the present exemplary embodiment, the connection unit 111 includes an interface for communicating with an external apparatus via a wireless LAN. The control unit 101 implements wireless communication with an external apparatus by controlling the connection unit 111. The communication method is not limited to the wireless LAN communication.

The digital camera 100 according to the present exemplary embodiment can operate as a slave unit in an infrastructure mode of the wireless LAN. When operating as a slave unit, the digital camera 100 can connect to a nearby access point (AP) to join a network formed by the AP. The digital camera 100 according to the present exemplary embodiment can operate as an AP of simplified form (hereinafter, simplified AP) which is a type of AP but with only limited functions. The AP according to the present exemplary embodiment is an example of a relay apparatus. If the digital camera 100 operates as a simplified AP, the digital camera 100 forms a network by itself. Apparatuses around the digital camera 100 recognize the digital camera 100 as an AP and can join the network formed by the digital camera 100. A program for operating the digital camera 100 as described above is stored in the nonvolatile memory 103.

The digital camera 100 according to the present exemplary embodiment is a type of AP, or a simplified AP without a gateway function of transferring data received from a slave unit to an Internet provider. If the digital camera 100 receives data from another apparatus participating in the network formed by the own apparatus, the digital camera 100 cannot transfer the data to a network such as the Internet. In another exemplary embodiment, the digital camera 100 may be configured to have a gateway function.

A proximity wireless connection unit 112 includes, for example, an antenna for wireless communication, and a modulation and demodulation circuit and a communication controller for processing wireless signals. The proximity wireless connection unit 112 implements contactless proximity communication according to the International Organization for Standardization (ISO)/International Electrotechnical Communication (IEC) 18092 standard (near field communication (NFC)) by outputting a modulated wireless signal from the antenna and demodulating a wireless signal received by the antenna. The proximity wireless connection unit 112 according to the present exemplary embodiment is arranged on a side portion of the digital camera 100.

The digital camera 100 and an external device apparatus 200 to be described below start communication and are connected if their proximity wireless connection units are brought into close proximity to each other. If the proximity wireless connection units are used for connection, the proximity wireless connection units do not necessarily need to be put in contact with each other. Since the proximity wireless connection units can communicate over a certain distance, the two apparatuses to be connected need only to be brought into close proximity within a range capable of proximity wireless communication. In the following description, bringing the apparatuses into close proximity within the range capable of proximity wireless communication will also be referred to as bringing the apparatuses close to each other.

If each other's proximity wireless connection units are in a range that is not capable of proximity wireless communication, the apparatuses do not start communication. Suppose that digital cameras 100 are connected for communication, with each other's proximity wireless connection units 112 in a range capable of proximity wireless communication. If each other's proximity wireless connection units 112 are separated to a range that is not capable of proximity wireless communication, the communication connection is disconnected. The contactless proximity communication for the proximity wireless connection unit 112 to implement is not limited to NFC, and other wireless communications may be employed. For example, the contactless proximity communication according to the ISO/IEC 14443 standard may be employed as the contactless proximity communication for the proximity wireless connection unit 112 to implement.

A short-range wireless connection unit 113 includes, for example, an antenna for wireless communication, and a modulation and demodulation circuit and a communication controller for processing wireless signals. The short-range wireless connection unit 113 implements short-range wireless communication according to the Institute of Electrical and Electronics Engineers (IEEE) 802.15 standard (Bluetooth®) by outputting a modulated wireless signal from the antenna and demodulating a wireless signal received by the antenna. In the present exemplary embodiment, low power consumption Bluetooth® Low Energy version 4.0 is employed for Bluetooth® communication. The Bluetooth® communication has a narrow communicable range (i.e., a short communicable distance), compared to wireless LAN communication. The Bluetooth® communication has a communication speed lower than that of the wireless LAN communication. The Bluetooth® communication has power consumption lower than that of the wireless LAN communication.

Next, a configuration and functions of the external device apparatus 200 according to the present exemplary embodiment will be described with reference to FIG. 2. In the following description, a mobile phone is described as an example of the external device apparatus 200 according to the present exemplary embodiment. However, this is not restrictive. For example, the present exemplary embodiment may be applied to information processing apparatuses such as a digital camera with wireless functions, a portable media player, a tablet device, a personal computer, and a smartphone.

In FIG. 2, a control unit 201 controls various parts of the external device apparatus 200 according to input signals as well as programs to be described below. Instead of controlling the entire apparatus by the control unit 201, a plurality of pieces of hardware may control the entire apparatus by performing processing in a distributed manner.

An imaging unit 202 includes a lens. The imaging unit 202 converts object light focused by the lens into an electrical signal, performs noise reduction, and outputs digital data as image data. The captured image data is stored in a buffer memory, and then the control unit 201 performs a predetermined calculation and records the resulting image data on a recording medium 210.

A nonvolatile memory 203 is an electrically erasable and recordable nonvolatile memory. The nonvolatile memory 203 stores various programs to be executed by the control unit 201. A program for communicating with the digital camera 100 is also stored in the nonvolatile memory 203, and is installed as a camera communication application. Processing of the external device apparatus 200 according to the present exemplary embodiment is implemented by reading a program provided by the camera communication application. The camera communication application includes a program for using basic functions of an operating system (OS) installed on the external device apparatus 200. The OS of the external device apparatus 200 may include a program for implementing processing according to the present exemplary embodiment.

A working memory 204 is used as a buffer memory for temporarily storing the image data generated by the imaging unit 202, an image display memory of a display unit 206, and a working area of the control unit 201.

An operation unit 205 is used to accept instructions to the external device apparatus 200 from the user. For example, the operation unit 205 includes operation members such as a power button for the user to instruct the external device apparatus 200 to power on/off, and a touch panel formed on the display unit 206.

The display unit 206 displays image data and displays characters for interactive operations. The display unit 206 does not necessarily need to be built in the external device apparatus 200. The external device apparatus 200 may be connectable to the display unit 206 and at least have a display control function of controlling display of the display unit 206.

The recording medium 210 can record the image data output from the imaging unit 202. The recording medium 210 may be configured to be removably attachable to the external device apparatus 200. The recording medium 210 may be built in the external device apparatus 200. In other words, the external device apparatus 200 can at least include a unit for accessing the recording medium 210.

A connection unit 211 is an interface for connection with another external apparatus. The external device apparatus 200 according to the present exemplary embodiment can exchange data with another external apparatus via the connection unit 211. In the present exemplary embodiment, the connection unit 211 includes an interface for communicating with another external apparatus via a wireless LAN. The connection unit 211 implements wireless communication with another external apparatus by controlling the connection unit 211.

A public network connection unit 212 is an interface for use in performing public wireless communication. The external device apparatus 200 can perform data communication via the public network connection unit 212. For a call, the control unit 201 inputs and outputs audio signals via a microphone 213 and a speaker 214. In the present exemplary embodiment, the public network connection unit 212 includes an interface for communication based on the third generation (3G). The communication method is not limited to 3G, and other communication methods such as Long Term Evolution (LTE), WiMAX (registered trademark), an asymmetric digital subscriber line (ADSL), fiber-to-the-home (FTTH), and the fourth generation (4G) may be used. The connection unit 211 and the public network connection unit 212 do not necessarily need to include independent pieces of hardware. For example, one antenna may be used for both.

A proximity wireless connection unit 215 is an interface for establishing a proximity wireless connection with another external apparatus. The external device apparatus 200 according to the present exemplary embodiment can exchange data with another external apparatus via the proximity wireless connection unit 215. In the present exemplary embodiment, the proximity wireless connection unit 215 includes an interface for communicating with another external apparatus by NFC. The control unit 201 implements the NFC with another external apparatus by controlling the proximity wireless connection unit 215.

A short-range wireless connection unit 216 is an interface for establishing a short-range wireless connection with another external apparatus. The external device apparatus 200 according to the present exemplary embodiment can exchange data with another external apparatus via the short-range wireless connection unit 216. In the present exemplary embodiment, the short-range wireless connection unit 216 includes an interface for communicating with another external apparatus by Bluetooth®. The control unit 201 implements the Bluetooth® communication with another external apparatus by controlling the short-range wireless connection unit 216.

A case in which the user operates the operation unit 105 of the digital camera 100 and the digital camera 100 establishes a wireless LAN connection with the external device apparatus 200 by using a user interface (UI) displayed on the display unit 106 will be described with reference to FIG. 3A.

The user operates the operation unit 105 of the digital camera 100 to activate a wireless LAN (connection by a simplified AP). Here, the display unit 106 displays a message for prompting the user to operate the external device apparatus 200. For example, see a screen display example 301 "CONNECT TO NETWORK BELOW AND ACTIVATE APPLICATION". The display unit 106 also displays a service set identifier (SSID) and a password which are parameters of the activated simplified AP. A screen display example 302 includes "SSID: CAMERA_000" and "Password: 12345678". If the simplified AP is activated by the digital camera 100, the user makes wireless LAN settings to the external device apparatus 200. The user here selects an SSID 'CAMERA_000' and inputs a password '12345678', whereby connection of the wireless LAN is completed. After the connection of the wireless LAN is completed, the user activates the application on the external device apparatus 200. The application, when activated, performs an operation to find a digital camera or digital cameras. If the digital camera 100 is found, the display unit 206 displays a screen 303 on the display unit 206. The name of the digital camera 100 is displayed on a list of found cameras. A value such as a previously-set nickname of the digital camera 100 is displayed as the name. In the present exemplary embodiment, the name is 'CAMERA1' 304. If the user selects a predetermined digital camera 100 from the camera list on the screen 303, the external device apparatus 200 makes a connection request to the digital camera 100. The digital camera 100 receives the connection request. If the digital camera 100 receives the connection request, the digital camera 100 displays a message for asking permission to communicate with the external device apparatus 200, on the display unit 106. A screen display example 305 includes a message "CONNECT TO XXXXXX". The name of the target device is displayed for XXXXXX. In the case where the user permits the communication, the user selects an OK button 306, whereby a connection permission response is returned from the digital camera 100 to the external device apparatus 200. On the other hand, if the user does not permit the communication, the user selects a cancel button 307, whereby a communication rejection response is returned from the digital camera 100 to the external device apparatus 200. Such a permission screen (connection permission screen) is displayed if the connection is attempted for the first time. At the second and subsequent times of connection, a connection permission response to the connection request is transmitted without display of the permission screen. The digital camera 100 completes the connection by transmitting the connection permission response. The external device apparatus 200 completes the connection by receiving the connection permission response.

Figure 3B:
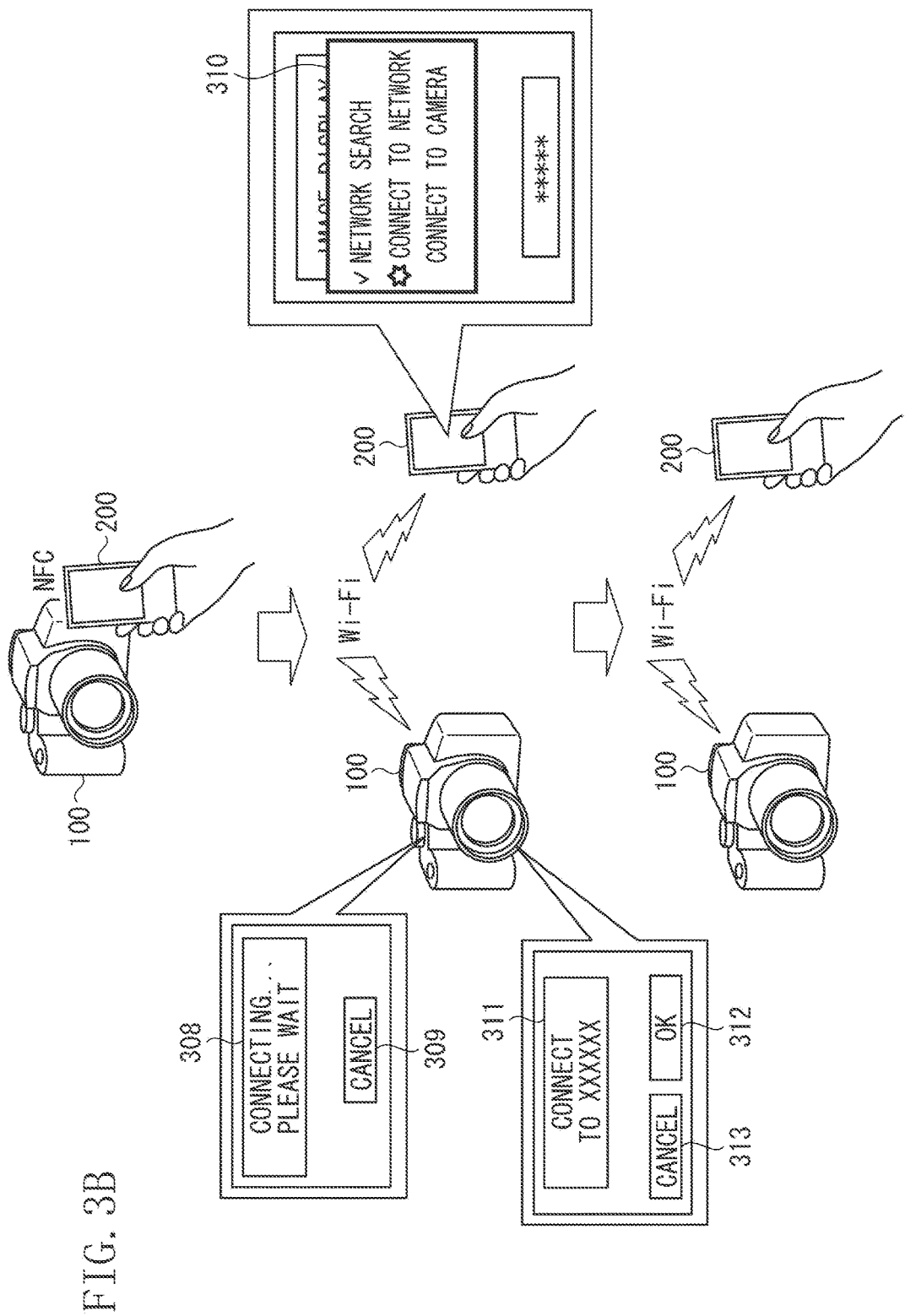
FIG. 3B is a diagram illustrating a handover from near field communication (NFC) to wireless local area network (LAN) communication according to the exemplary embodiment.

Next, a case in which the digital camera 100 and the external device apparatus 200 switch communication to and establish a connection with the wireless LAN by using proximity wireless communication (NFC) will be described with reference to FIG. 3B. In the present exemplary embodiment, such processing for switching communication to a communication method by using information obtained by another communication method will be referred to as handover processing.

The proximity wireless connection unit 112 of the digital camera 100 and the proximity wireless connection unit 215 of the external device apparatus 200 perform NFC communication when brought close to each other. The parameters (wireless LAN parameters) of the digital camera 100 needed to perform a handover to the wireless LAN by NFC communication are determined in advance before the NFC communication is performed. Examples of the needed parameters include the SSID and password of the wireless LAN. The external device apparatus 200 receives the parameters from the digital camera 100 by NFC communication. If the NFC communication with the external device apparatus 200 is completed, the digital camera 100 forms a simplified AP by using the wireless LAN parameters determined in advance. The digital camera 100 here enters an operation to wait for a connection from the external device apparatus 200, and displays a message on the display unit 106. For example, see a screen display example 308 "CONNECTING . . . PLEASE WAIT". If the user cancels the wait for a connection from the external device apparatus 200, the user selects a cancel button 309 to end the handover processing. On the other hand, if the external device apparatus 200 receives the parameters by NFC communication, the external device apparatus 200 connects to the wireless LAN according to the received parameters. The external device apparatus 200 displays the state during the connection operation on the display unit 206. A screen display example 310 includes an item 'NETWORK SEARCH' which is checked if the SSID of the wireless LAN is found. An item 'CONNECT TO NETWORK' is checked if the wireless LAN connection is completed and an Internet Protocol (IP) connection is completed. An item 'CONNECT TO CAMERA' is checked if the connection to the digital camera 100 is completed, whereby the connection to the camera is completed. After the wireless LAN connection is completed and the IP connection is completed, the external device apparatus 200 makes a connection request. The digital camera 100 receives the connection request, and a message for asking permission to communicate with the external device apparatus 200 is displayed on the display unit 106. See a screen display example 311 "CONNECT TO XXXXXX". The name of the target device is displayed for XXXXXX. If the user permits the communication, the user selects an OK button 312, whereby a connection permission response is returned from the digital camera 100 to the external device apparatus 200. On the other hand, if the user does not permit the communication, the user selects a cancel button 313, whereby a communication rejection response is returned from the digital camera 100 to the external device apparatus 200. Such a permission screen (connection permission screen) is displayed if the connection is attempted for the first time. At the second and subsequent times of connection, a connection permission response to the connection request is transmitted without display of the permission screen. The digital camera 100 completes the connection by transmitting the connection permission response. The external device apparatus 200 completes the connection by receiving the connection permission response.

Next, a case in which the digital camera 100 and the external device apparatus 200 make a handover connection to the wireless LAN communication by using Bluetooth® will be described with reference to FIG. 3C.

Suppose that the short-range wireless connection unit 113 of the digital camera 100 and the short-range wireless connection unit 216 of the external device apparatus 200 are done with pairing processing of Bluetooth® communication. Once the pairing processing is performed, the short-range wireless connection units 113 and 216 within the communication range can connect automatically by Bluetooth® communication. A message 315 indicates that Bluetooth® communication is being established. When Bluetooth® communication is established, the digital camera 100 transmits and shares the parameters needed to perform a handover to the wireless LAN communication to and with the external device apparatus 200. Examples of the needed parameters include the SSID and password of the wireless LAN.

A screen display example 314 is displayed on the display unit 206 of the external device apparatus 200 if the connection by the short-range wireless communication is completed. An "IMAGE DISPLAY" button is used for displaying images recorded on the recording medium 110 in the digital camera 100. A "REMOTE LV" button is used for displaying an image captured by the imaging unit 102 of the digital camera 100 in real time. If either one of the buttons is operated, handover processing to the wireless LAN communication is started. If the handover processing is started, the external device apparatus 200 transmits a handover request to the digital camera 100 by Bluetooth® communication. Receiving the handover request from the external device apparatus 200, the digital camera 100 determines whether a handover can be performed, and returns the result. If a handover can be performed, the digital camera 100 disconnects the Bluetooth® communication and forms a simplified AP according to the wireless LAN parameters shared in advance. The digital camera 100 here waits for a connection from the external device apparatus 200, and displays a message on the display unit 106. For example, see a screen display example 317 "CONNECTING . . . PLEASE WAIT". If the user cancels the wait for a connection from the external device apparatus 200, the user selects a cancel button 318 to end the handover processing. Meanwhile, the external device apparatus 200 connects to the wireless LAN according to the wireless LAN parameters received in advance by the Bluetooth® communication. See a screen display example 316 at that time. After the external device apparatus 200 completes the wireless LAN connection and an IP connection, the external device apparatus 200 makes a connection request. Receiving the connection request, the digital camera 100 transmits a connection permission response. The digital camera 100 completes the connection by transmitting the connection permission response. The external device apparatus 200 completes the connection by receiving the connection permission response.

Figure 4:
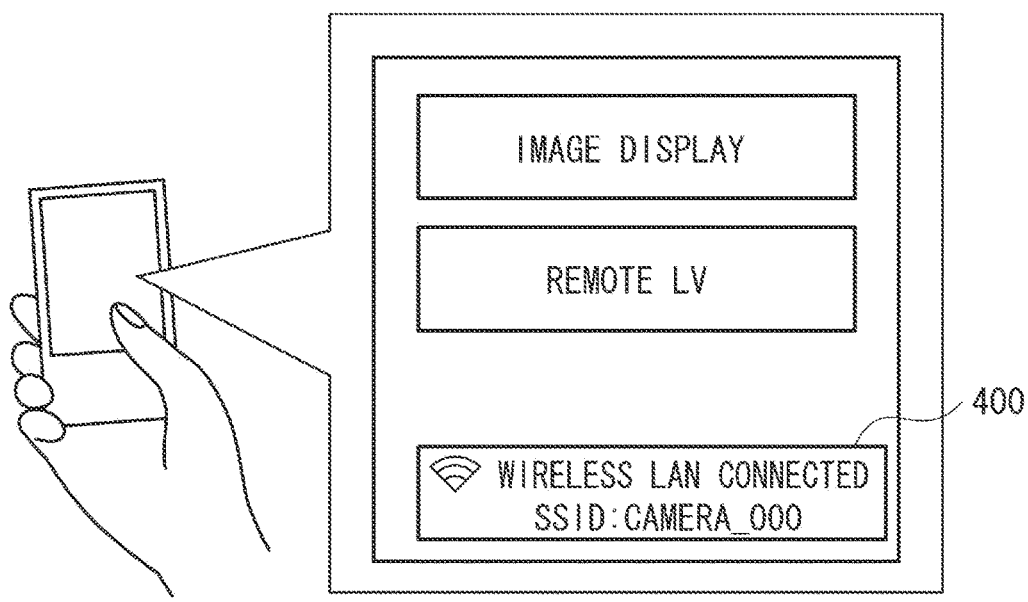
FIG. 4 illustrates a screen display example of the external device apparatus when a connection is completed, according to the exemplary embodiment.

FIG. 4 illustrates a screen display example of the external device apparatus 200 when the connection is completed by any one of the foregoing procedure. A message 400 indicates that the external device apparatus 200 is currently connected to the wireless LAN and the SSID is CAMERA_000.

If occurrence of a communication error due to some reason such as deteriorated radio wave environment is detected after the digital camera 100 and the external device apparatus 200 are connected by the wireless LAN, the digital camera 100 performs reconnection on the wireless LAN. The reconnection is intended to enable reconnection without operating the digital camera 100, in a case where the digital camera 100 is installed in a high place and an error occurs in the communication with the external device apparatus 200.

The external device apparatus 200 may be connected to a home AP for connecting to the Internet, aside from the wireless LAN connection with the digital camera 100. In such a case, the external device apparatus 200 can connect to the home AP if the wireless LAN connection with the digital camera 100 is disconnected. In such a situation, the digital camera 100 fails to reconnect to the external device apparatus 200 no matter how many times reconnection is attempted. This also consumes power since the digital camera 100 continues activating the wireless LAN connection. If the digital camera 100 includes a Bluetooth® function with lower power consumption than the wireless LAN and is able to perform Bluetooth® communication, the digital camera 100 switches to the Bluetooth® communication. The digital camera 100 can then reconnect by attempting a handover to the wireless LAN communication by the Bluetooth® communication.

In the present exemplary embodiment, the digital camera 100 determines whether to retry the wireless LAN connection or switch to Bluetooth® communication based on the connection mode upon disconnection, and performs reconnection processing.

Figure 5:
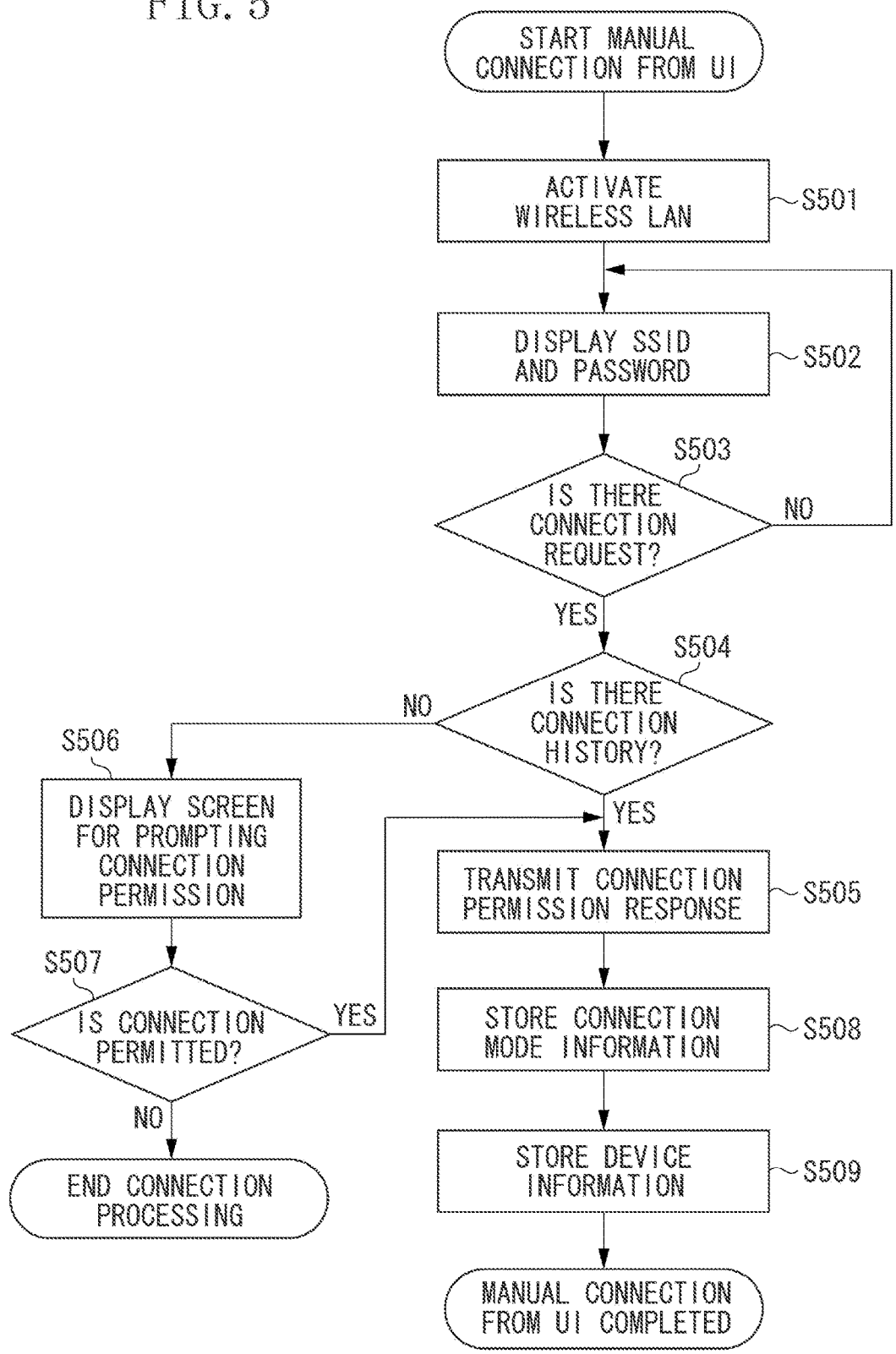
FIG. 5 is a flowchart up to completion of a manual connection by digital camera operations according to the exemplary embodiment.

FIG. 5 is a processing flowchart of the digital camera 100 in the case where the user operates the operation unit 105 of the digital camera 100 and the digital camera 100 establishes a wireless LAN connection with the external device apparatus 200 by using the UI displayed on the display unit 106.

[Processing Flow of Manual Connection from UI]

In step S501, the control unit 101 activates a wireless LAN via the connection unit 111. After the activation of the wireless LAN is completed, the processing proceeds to step S502. In the present exemplary embodiment, the processing of step S501 includes forming the wireless LAN and activating a simplified AP. However, the processing may include searching for an AP and joining a found AP.

In step S502, the control unit 101 displays an SSID and a password that are parameter information about the simplified AP formed in step S501 on the display unit 106. See the screen display examples 301 and 302. If the processing of step S501 includes joining an AP, the SSID of the AP may be displayed. After the display, the processing proceeds to step S503.

In step S503, the control unit 101 determines whether there is a connection request from the external device apparatus 200, via the connection unit 111. Information about the connection request includes a device name and a universal unique identifier (UUID), which is device identification information, of the external device apparatus 200. If there is a connection request (YES in step S503), the processing proceeds to step S504. If there is no connection request (NO in step S503), the processing proceeds to step S502.

In step S504, the control unit 101 determines whether there is a connection history. Whether there is a connection history is determined depending on whether the UUID included in the information about the connection request in step S503 is included in device information stored in step S509 to be described below. If there is a connection history (YES in step S504), the processing proceeds to step S505. If there is no connection history (NO in step S504), the processing proceeds to step S506.

In step S505, the control unit 101 transmits a connection permission response to the connection request to the external device apparatus 200 via the connection unit 111. After the transmission, the processing proceeds to step S508.

In step S506, the control unit 101 displays a screen for prompting connection permission on the display unit 106. See the screen display example 305. After the display, the processing proceeds to step S507.

In step S507, the control unit 101 determines whether the operation unit 105 is operated to give connection permission. If the user selects the OK button 306 on the connection permission screen of the screen display example 305 (YES in step S507), the processing proceeds to step S505. If the user selects the cancel button 307 on the connection permission screen of the screen display example 305 (NO in step S507), the control unit 101 performs connection termination processing. The processing of the present processing flow ends.

In step S508, the control unit 101 temporarily stores connection mode information into the working memory 104. Since the present processing flow is intended for a manual connection using the UI, information indicating a UI manual connection is stored in the working memory 104. After the connection mode information is stored, the processing proceeds to step S509.

In step S509, the control unit 101 stores device information into the nonvolatile memory 103. The device information includes the device name and the UUID, or device identification information, of the external device apparatus 200. The control unit 101 does not store the device information if the same device information already exists. Storing the device information, the control unit 101 determines that the connection is completed. The processing ends.

Figure 6:
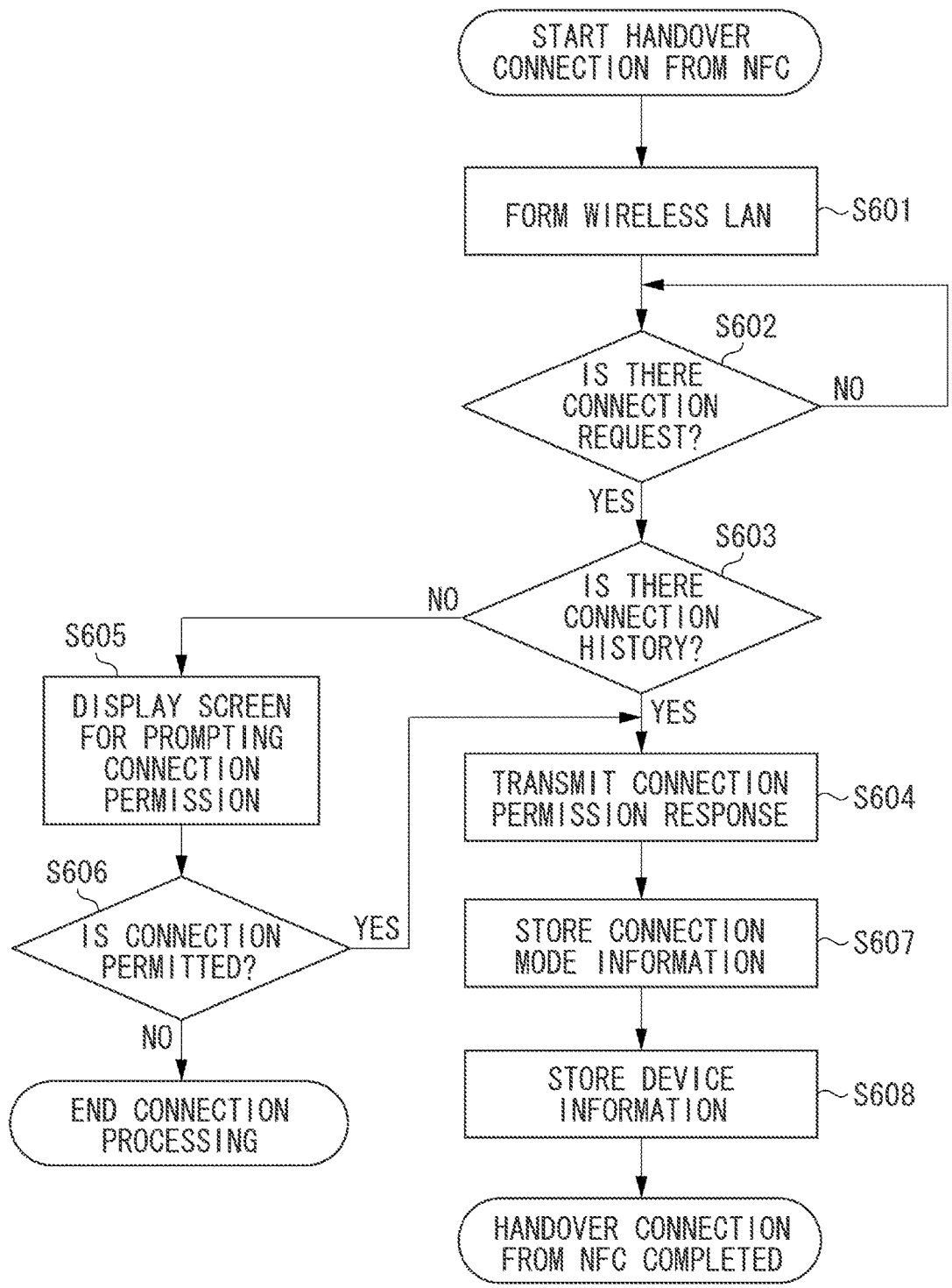
FIG. 6 is a flowchart up to completion of a connection by a handover from the NFC to the wireless LAN communication according to the exemplary embedment.

FIG. 6 is a handover connection processing flowchart of the digital camera 100 when the digital camera 100 and the external device apparatus 200 establish a wireless LAN connection by using proximity wireless communication (NFC).

The proximity wireless connection unit 112 of the digital camera 100 and the proximity wireless connection unit 215 of the external device apparatus 200 are brought close to each other to execute NFC communication. The execution of the NFC communication serves as a trigger to start connection.

[Processing Flow of Handover Connection from NFC]

In step S601, the control unit 101 forms a wireless LAN as a simplified AP. The wireless LAN here is formed by using the wireless LAN parameters (SSID and password) delivered to the external device apparatus 200 in advance by the NFC communication. After the wireless LAN is formed, the processing proceeds to step S602.

In step S602, the control unit 101 determines whether there is a connection request from the external device apparatus 200, via the connection unit 111. Information about the connection request includes the device name and the UUID, or device identification information, of the external device apparatus 200. If there is a connection request (YES in step S602), the processing proceeds to step S603. If there is no connection request (NO in step S602), the processing proceeds to step S602. In step S602, the control unit 101 determines again whether there is a connection request.

In step S603, the control unit 101 determines whether there is a connection history. Whether there is a connection history is determined depending on whether the UUID included in the information about the connection request in step S602 is included in the stored device information. If there is a connection history (YES in step S603), the processing proceeds to step S604. If there is no connection history (NO in step S603), the processing proceeds to step S605.

In step S604, the control unit 101 transmits a connection permission response to the connection request to the external device apparatus 200 via the connection unit 111. After the transmission, the processing proceeds to step S607.

In step S605, the control unit 101 displays a screen for prompting connection permission on the display unit 106. See the screen display example 311. After the display, the processing proceeds to step S606.

In step S606, the control unit 101 determines whether the operation unit 105 is operated to give connection permission. If the user selects the OK button 312 on the connection permission screen of the screen display example 311 (YES in step S606), the processing proceeds to step S604. If the user selects the cancel button 313 on the connection permission screen of the screen display example 311 (NO in step S606), the control unit 101 performs connection termination processing. The processing of the present processing flow ends.

In step S607, the control unit 101 temporarily stores connection mode information into the working memory 104. Since the present processing flow uses a connection by NFC, information indicating an NFC connection is stored in the working memory 104. After the connection mode information is stored, the processing proceeds to step S608.

In step S608, the control unit 101 stores device information into the nonvolatile memory 103. The device information includes the device name and the UUID, or device identification information, of the external device apparatus 200. The control unit 101 does not store the device information if the same device information already exists. Storing the device information, the control unit 101 determines that the connection is completed. The processing ends.

Figure 7:
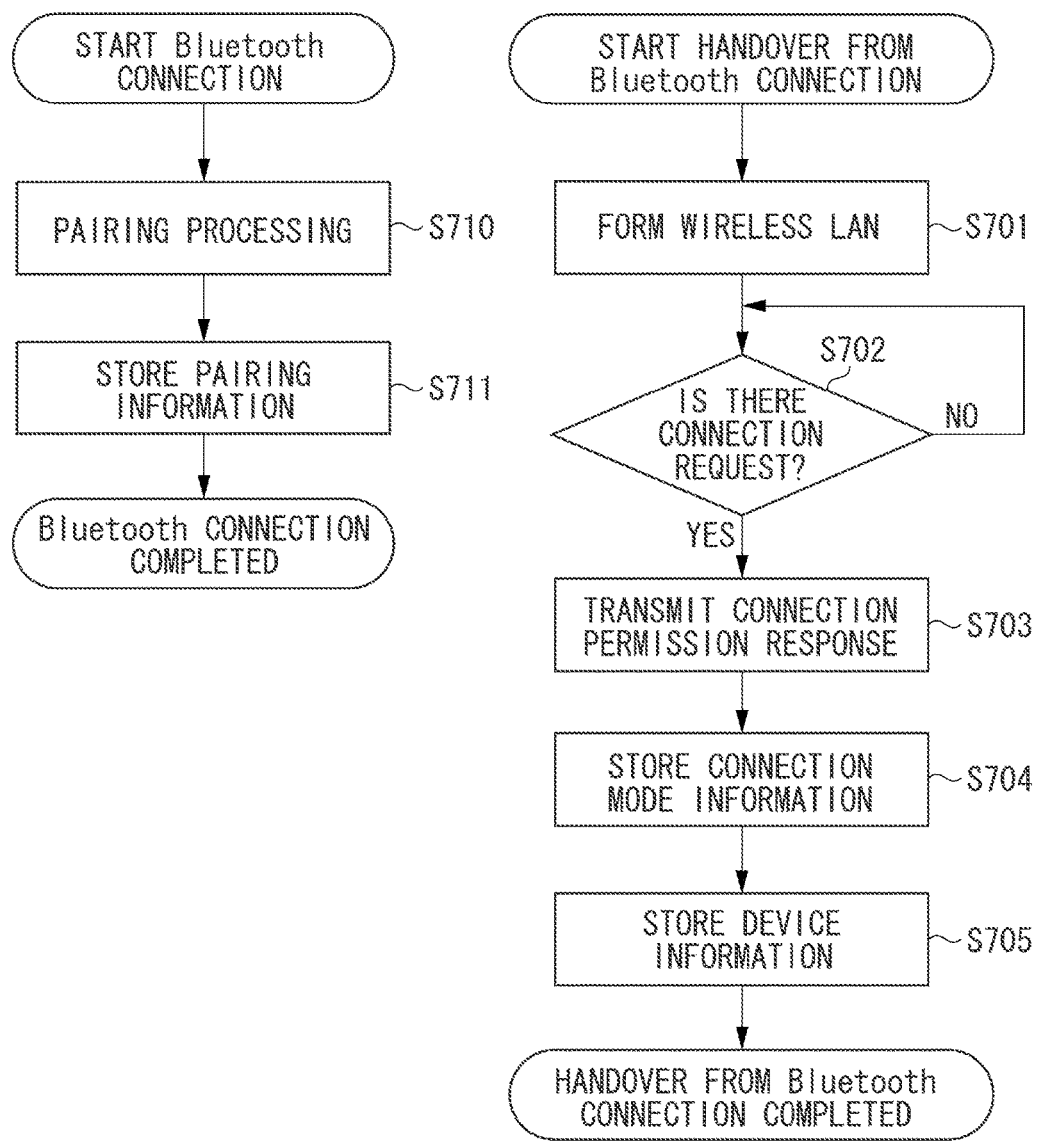
FIG. 7 is a flowchart up to completion of a connection by a handover from the Bluetooth® communication to the wireless LAN communication according to the exemplary embodiment.

FIG. 7 is a flowchart illustrating a Bluetooth® connection processing flow of the digital camera 100 and the external device apparatus 200 and a handover connection processing flowchart of the digital camera 100 when the digital camera 100 and the external device apparatus 200 establish a wireless LAN connection by using Bluetooth® connection.

The short-range wireless connection unit 113 of the digital camera 100 and the short-range wireless connection unit 216 of the external device apparatus 200 performs the pairing processing of Bluetooth® communication. If the digital camera 100 receives a handover request from the external device apparatus 200, the digital camera 100 starts a connection operation.

[Bluetooth® Connection Processing Flow]

In step S710, the control unit 101 performs the pairing processing. After the pairing processing is ended, the processing proceeds to step S711.

In step S711, the control unit 101 stores pairing information into the nonvolatile memory 103. The pairing information includes the UUID, or device identification information. The control unit 101 does not store the pairing information if the same pairing information already exists. Storing the pairing information, the control unit 101 determines that the connection is completed.

[Processing Flow of Handover from Bluetooth® Connection]

In step S701, the control unit 101 forms a wireless LAN as a simplified AP. The wireless LAN here is formed by using the wireless LAN parameters (SSID and password) delivered to the external device apparatus 200 in advance by the Bluetooth® communication. After the wireless LAN is formed, the processing proceeds to step S702.

In step S702, the control unit 101 determines whether there is a connection request from the external device apparatus 200, via the connection unit 111. Information about the connection request includes the device name and the UUID, or device identification information, of the external device apparatus 200. If there is a connection request (YES in step S702), the processing proceeds to step S703. If there is no connection request (NO in step S702), the processing proceeds to step S702. In step S702, the control unit 101 determines again whether there is a connection request.

In step S703, the control unit 101 transmits a connection permission response to the connection request to the external device apparatus 200 via the connection unit 111. After the transmission, the processing proceeds to step S704.

In step S704, the control unit 101 temporarily stores connection mode information into the working memory 104. Since the present processing flow uses a Bluetooth® connection, information indicating a Bluetooth® connection is stored into the working memory 104. After the connection mode information is stored, the processing proceeds to step S705.

In step S705, the control unit 101 stores device information into the nonvolatile memory 103. The device information includes the device name and the UUID, or device identification information, of the external device apparatus 200. The control unit 101 does not store the device information if the same device information already exists. Storing the device information, the control unit 101 determines that the connection is completed. The processing ends.

Figure 8:
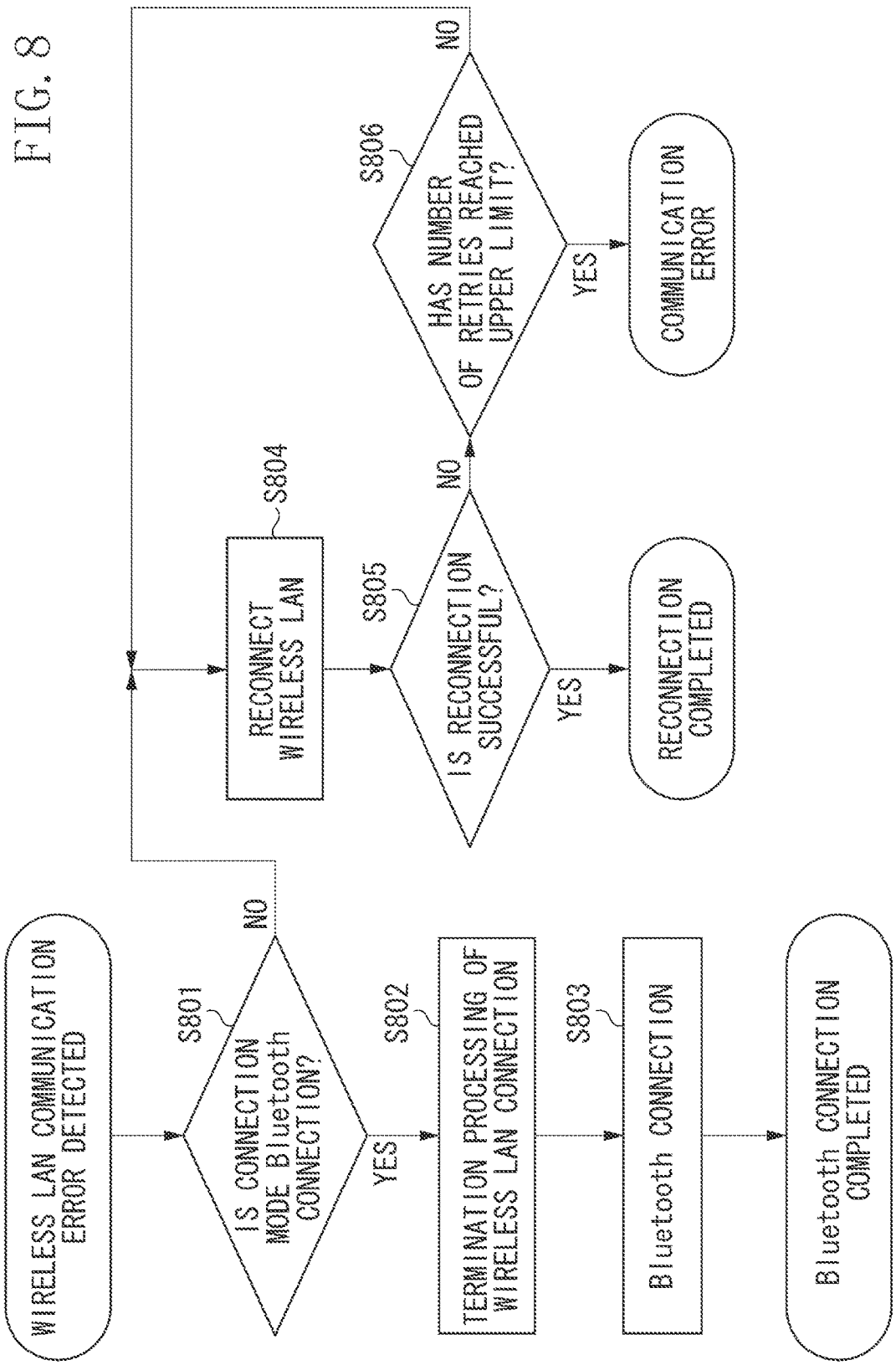
FIG. 8 is a flowchart of processing when a communication error occurs, according to the exemplary embodiment.
Figure 9A:
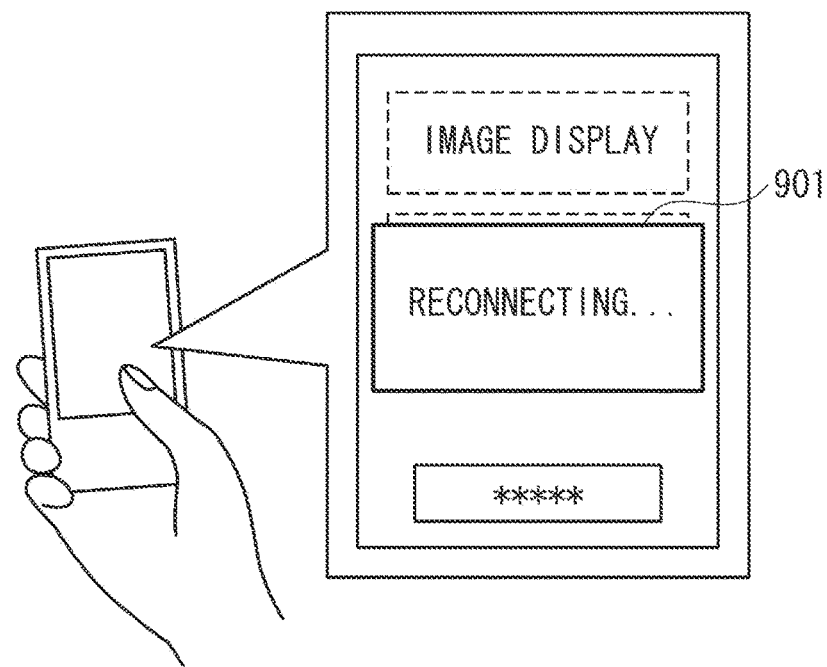
FIGS. 9A and 9B illustrate screen display examples of the external device apparatus when a communication error occurs, according to the exemplary embodiment.
Figure 9B:
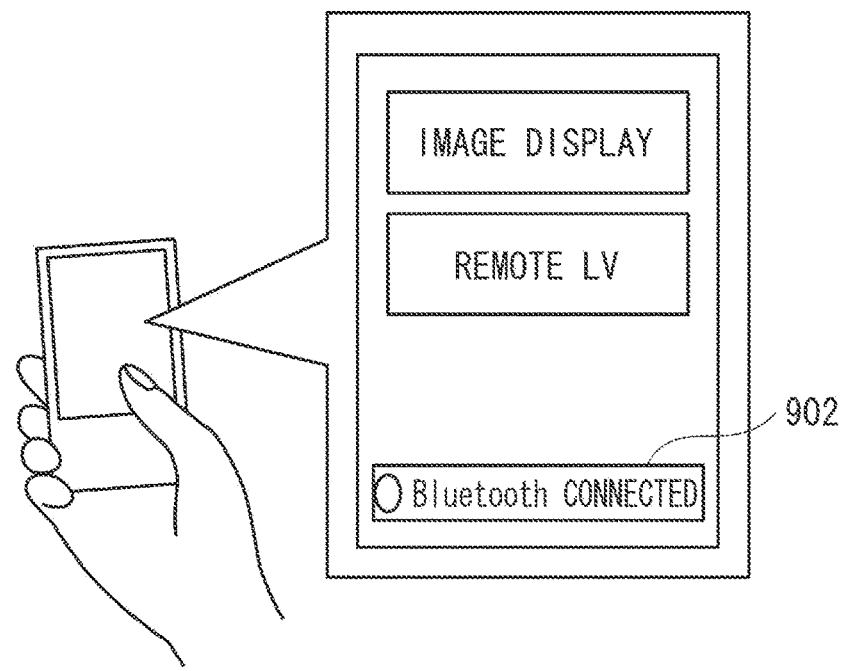

FIG. 8 is a processing flowchart of the digital camera 100 when a communication error of the wireless LAN occurs between the digital camera 100 and the external device apparatus 200 due to some reason. FIG. 9A illustrates a screen display example 901 during reconnection of the external device apparatus 200 when Bluetooth® connection is not used. FIG. 9B illustrates a screen display example 902 during the reconnection of the external device apparatus 200 when Bluetooth® connection is used.

In step S801, the control unit 101 detects a disconnection. The control unit 101 refers to the connection mode information stored in the working memory 104, and determines whether the connection mode is a Bluetooth® connection. If the connection mode is a Bluetooth® connection (YES in step S801), the processing proceeds to step S802. If the connection mode is not a Bluetooth® connection (NO in step S801), the processing proceeds to step S804. The reason for making such a determination is that if the connection mode is a Bluetooth® connection, the digital camera 100 has established a Bluetooth® connection with the external device apparatus 200 once and the possibility of a successful Bluetooth® reconnection is high.

In step S802, the control unit 101 disconnects the wireless LAN connection and performs termination processing of the wireless LAN connection. The processing proceeds to step S803.

In step S803, the control unit 101 activates a Bluetooth® module and establishes a connection. Since the digital camera 100 and the external device apparatus 200 have already been subjected to Bluetooth® paring, a Bluetooth® connection can be established if the external device apparatus 200 lies within the communication range. If the external device apparatus 200 is not within the communication range, the digital camera 100 waits in a Bluetooth® connection standby state. In the Bluetooth® connection standby state, the digital camera 100 can operate with low power consumption. Once the digital camera 100 enters the Bluetooth® connection standby state, the Bluetooth® connection can be automatically completed when the distance to the external device apparatus 200 falls within the Bluetooth® communication range. If the Bluetooth® connection is completed, the screen display example 314 in FIG. 3C is displayed on the external device apparatus 200. If the external device apparatus 200 performs the handover processing, the digital camera 100 performs the processing flow of a handover connection from Bluetooth® in FIG. 7.

In step S804, the control unit 101 performs reconnection of the wireless LAN. If the digital camera 100 serves as a simplified AP, the control unit 101 forms the wireless LAN again and waits for the external device apparatus 200 to join the wireless LAN and for a connection request from the external device apparatus 200. If the digital camera 100 connects to an AP, the control unit 101 joins the wireless LAN and waits for a connection request from the external device apparatus 200. After the reconnection of the wireless LAN, the processing proceeds to step S805.

In step S805, the control unit 101 determines whether the reconnection is successful. To determine whether the reconnection is successful, the control unit 101 initially determines whether the wireless LAN connection is successfully performed. If the wireless LAN connection is successfully performed, the control unit 101 then determines whether the reconnection is successful, depending on whether there is a connection request from the external device apparatus 200. If the connection of the wireless LAN is failed, the control unit 101 determines that the reconnection is failed. If the reconnection is determined to be successful (YES in step S805), the reconnection processing ends. The control unit 101 resumes communication. If the reconnection is determined to be failed due to a time-out (NO in step S805), the processing proceeds to step S806.

In step S806, the control unit 101 determines whether the number of retries of the reconnection processing has reached its upper limit. If the number of retries has reached the upper limit (YES in step S806), the control unit 101 determines it to be a communication error, and performs error processing. The processing ends. If the number of retries has not reached the upper limit (NO in step S806), the processing proceeds to step S804.

As has been described above, in the present exemplary embodiment, if a communication error occurs between the digital camera 100 and the external device apparatus 200 due to some reason, the control unit 101 switches the reconnection depending on whether the connection mode is a Bluetooth® connection. The power consumption can thereby be suppressed if the connection mode is a Bluetooth® connection.

Figure 10:
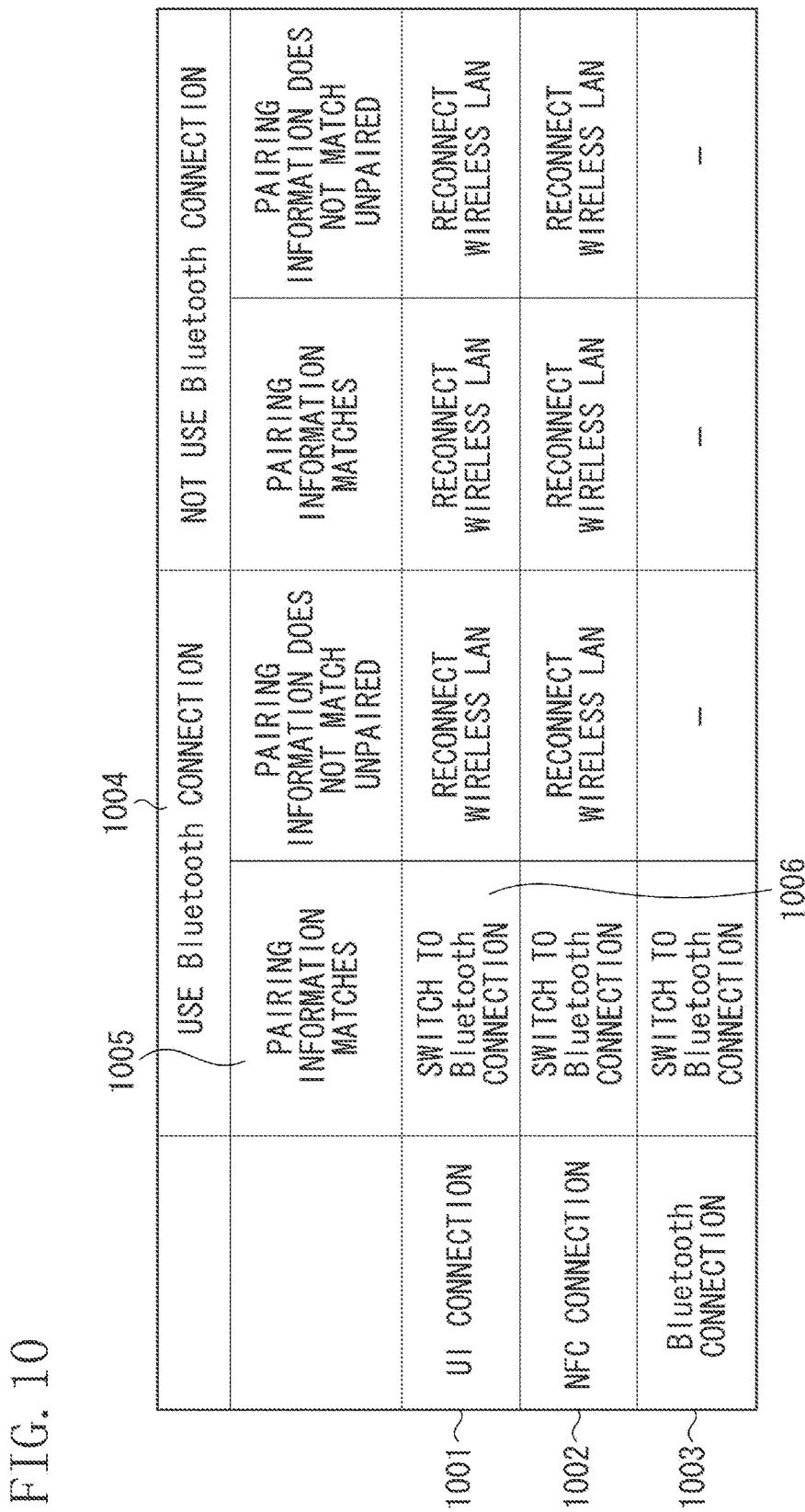
FIG. 10 is a table illustrating reconnection determination conditions according to a second exemplary embodiment.

A second exemplary embodiment will be described. In the first exemplary embodiment, the digital camera 100 makes the determination depending only on whether the connection mode is a Bluetooth® connection in step S801 in FIG. 8. FIG. 10 is a table illustrating determination processing results obtained in a case where several determination conditions are added to the condition of such determination processing.

The determination conditions will be described below with reference to FIG. 10.

Rows 1001, 1002, and 1003 represent respective connection modes stored in the working memory 104 in the first exemplary embodiment, namely, a UI manual connection, an NFC connection, and a Bluetooth® connection. A row 1004 indicates setting values whether the digital camera 100 uses a Bluetooth® connection. A row 1005 indicates whether pairing information stored in the nonvolatile memory 103 matches connection device information. The pairing information is needed in establishing a Bluetooth® connection, and includes a UUID, i.e., device identification information. Suppose, for example, that the digital camera 100 is in a state of being set to use a Bluetooth® connection, or "USE Bluetooth CONNECTION" (1004), and is connected with the external device apparatus 200. If the connection mode at that time is "UI CONNECTION" (1001), and the value of the UUID included in the pairing information matches the value of the UUID included in the device information about the connected external device apparatus 200, or "PAIRING INFORMATION MATCHES" (1005), the digital camera 100 determines to "SWITCH TO Bluetooth CONNECTION" (1006). Such a determination condition enables the reconnection by a Bluetooth® connection with suppressed power consumption even if the connection mode is not the Bluetooth® connection.

A third exemplary embodiment will be described. In the first exemplary embodiment, the external device apparatus 200 displays the screen in FIG. 9B while the digital camera 100 performs the processing of step S803 in FIG. 8. After the external device apparatus 200 completes the Bluetooth® connection, the user needs to operate the "IMAGE DISPLAY" button or the "REMOTE LV" button to start the handover processing to the wireless LAN again. The user may therefore be unaware of the connection state.

Then, in the present exemplary embodiment, if an error occurs in the wireless LAN communication and the reconnection by the Bluetooth® communication is completed, handover connection processing to the wireless LAN is automatically performed. The automatic handover connection processing to the wireless LAN enables reconnection without the user's operation.

Even if the external device apparatus 200 happens to connect to another AP due to a communication error, the handover connection processing to the wireless LAN can be automatically started for reconnection without the user's awareness.

Exemplary embodiments have been described above. However, these exemplary embodiments are not seen to be limiting, and various modifications and changes may be made without departing from the scope thereof.

An exemplary embodiment can also be implemented by supplying software (program) for implementing the functions of the foregoing exemplary embodiments to a system or an apparatus via a network or various storage media, and reading and executing the program by a computer (or central processing unit (CPU) or microprocessing unit (MPU)) of the system or apparatus.

According to an exemplary embodiment, a device including a communication switching function can be easily reconnected with suppressed power consumption.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-031500, filed Feb. 22, 2017, which is hereby incorporated by reference herein in its entirety.

What is claimed is:

1. A communication apparatus that communicates with an external apparatus, the communication apparatus comprising:
    at least one processor;
    a memory;
    a first communication interface; and
    a second communication interface,
    wherein the processor is configured to function as:
    a storage unit configured to, when communication via the first communication interface is established, store information of a mode of the established communication via the first communication interface, wherein the information indicates whether the communication via the first communication interface was established from communication via the second communication interface by performing handover processing;
    a determination unit configured to, if an error of the established communication via the first communication interface is detected, determine whether to establish communication via the second communication interface or re-establish the communication via the first communication interface based on the stored information of the mode of the established communication, wherein the determination unit determines to establish communication via the second communication interface in a case where the communication via the first communication interface of which the error is detected was established from the communication via the second communication interface by performing handover processing; and
    a control unit configured to start processing for establishing the communication with an external apparatus in accordance with the determination by the determination unit.

2. The communication apparatus according to claim 1, wherein the first communication interface is a communication interface for a wireless local area network (LAN).

3. The communication apparatus according to claim 1, wherein the second communication interface is a communication interface for Bluetooth® communication.

4. The communication apparatus according to claim 1, wherein the control unit performs handover processing from the communication via the second communication interface to the communication via the first communication interface in a case where the communication via the first communication interface is re-established after detection of the error in accordance with the determination by the determination unit.

5. The communication apparatus according to claim 1, wherein the mode of the established communication includes a mode in which the communication via the first interface is established by using a user interface of the communication apparatus and a mode in which the communication via the first communication interface is established by using the communication via the second communication interface.

6. The communication apparatus according to claim 1, further comprising a third communication interface,
    wherein the mode of the established communication includes a mode in which the communication via the first communication interface is established by using communication via the third communication interface and a mode in which the communication via the first communication interface is established by using the communication via the second communication interface.

7. The communication apparatus according to claim 1, wherein if the mode of the established communication is the mode in which the communication via the first communication interface is established by using a user interface of the communication apparatus, the determination unit determines to re-establish the communication with the external apparatus via the first communication interface.

8. The communication apparatus according to claim 1, further comprising a third communication interface,
wherein if the mode of the established communication is a mode in which the communication via the first communication interface is established by using communication via the third communication interface, the determination unit determines to re-establish the communication with the external apparatus via the first communication interface.

9. A method for controlling a communication apparatus that includes a first communication interface and a second communication interface and communicates with an external apparatus, the method comprising:
storing, when communication via the first communication interface is established, information of a mode of the established communication via the first communication interface, wherein the information indicates whether the communication via the first communication interface was established from communication via the second communication interface by performing handover processing;
determining, if an error of the established communication via the first communication interface is detected, whether to establish communication via the second communication interface or re-establish the communication via the first communication interface based on the stored information of the mode of the established communication, wherein, in the determining, establishing communication via the second communication interface is determined in a case where the communication via the first communication interface of which the error is detected was established from the communication via the second communication interface by performing handover processing; and
starting processing for establishing the communication with an external apparatus in accordance with the determination in the determining.

10. A non-transitory computer-readable storage medium storing instructions that, when executed by a computer, cause the computer to perform a method for controlling a communication apparatus that includes a first communication interface and a second communication interface and that communicates with an external apparatus, the method comprising:
storing, when communication via the first communication interface is established, information of a mode of the established communication via the first communication interface, wherein the information indicates whether the communication via the first communication interface was established from communication via the second communication interface by performing handover processing;
determining, if an error of the established communication via the first communication interface is detected, whether to establish communication via the second communication interface or re-establish the communication via the first communication interface based on the stored information of the mode of the established communication, wherein, in the determining, establishing communication via the second communication interface is determined in a case where the communication via the first communication interface of which the error is detected was established from the communication via the second communication interface by performing handover processing; and
starting processing for establishing the communication with an external apparatus in accordance with the determination in the determining.

11. A communication apparatus that communicates with an external apparatus, the communication apparatus comprising:
a first communication interface;
a second communication interface;
a storage device configured to, in accordance with communication with the external apparatus via the first communication interface being established, store information of a mode of the established communication via the first communication interface, wherein the information indicates whether the communication via the first communication interface was established from communication via the second communication interface by performing handover processing, and
a communication controller configured to, in a case where an error of the established communication with the external apparatus via the first communication interface is detected and the stored information in the storage device indicates that the communication in which the error is detected was established from the communication via the second communication interface by performing handover processing, start processing for re-establishing the communication with the external apparatus via the second communication interface.

12. The communication apparatus according to claim 11, wherein the communication controller, after re-establishing the communication with the external apparatus via the second communication interface, automatically establishes the communication with the external apparatus via the first communication interface by performing handover processing.

13. The communication apparatus according to claim 11, wherein the communication controller is configured to, in a case where the error of the established communication with the external apparatus via the first communication interface is detected and the stored information in the storage device does not indicate that the communication in which the error is detected was established from the communication via the second communication interface by performing handover processing, start processing for re-establishing the communication with an external apparatus via the first communication interface.

14. The communication apparatus according to claim 11, wherein the first communication interface is a communication interface for a wireless local area network (LAN).

15. The communication apparatus according to claim 11, wherein the second communication interface is a communication interface for Bluetooth® communication.

* * * * *